United States Patent
Coudert et al.

(10) Patent No.: US 11,905,602 B2
(45) Date of Patent: Feb. 20, 2024

(54) METHOD FOR REINFORCING A STEEL COMPONENT BY CARBONITRIDING

(71) Applicant: SKF Aerospace France S.A.S, Montigny-le-Bretonneux (FR)

(72) Inventors: Jean-Baptiste Coudert, Granges les Beaumont (FR); Alexandre Mondelin, St-Marcel les Valence (FR)

(73) Assignee: SKF AEROSPACE FRANCE S.A.S, Montigny-le-Bretonneux (FR)

( * ) Notice: Subject to any disclaimer, the term of this patent is extended or adjusted under 35 U.S.C. 154(b) by 0 days.

(21) Appl. No.: 18/106,960

(22) Filed: Feb. 7, 2023

(65) Prior Publication Data
US 2023/0257865 A1 Aug. 17, 2023

(30) Foreign Application Priority Data
Feb. 11, 2022 (FR) ........................................ 2201204

(51) Int. Cl.
| | |
|---|---|
| *C23C 8/32* | (2006.01) |
| *C21D 1/74* | (2006.01) |
| *C21D 9/40* | (2006.01) |
| *C22C 38/00* | (2006.01) |
| *F16C 13/02* | (2006.01) |
| *F16C 19/06* | (2006.01) |

(52) U.S. Cl.
CPC .................. *C23C 8/32* (2013.01); *C21D 1/74* (2013.01); *C21D 9/40* (2013.01); *C22C 38/00* (2013.01); *F16C 13/02* (2013.01); *F16C 19/06* (2013.01); *C21D 2211/001* (2013.01)

(58) Field of Classification Search
CPC .............. C23C 8/32; C21D 9/40; C21D 1/74
See application file for complete search history.

(56) References Cited

U.S. PATENT DOCUMENTS

| | | |
|---|---|---|
| 8,714,831 B2 | 5/2014 | Mori |
| 2001/0001396 A1 | 5/2001 | Takayama et al. |
| 2002/0166607 A1 | 11/2002 | Altena et al. |
| 2005/0205163 A1 | 9/2005 | Ohki |
| 2009/0078339 A1 | 3/2009 | Volkmuth et al. |
| 2012/0103473 A1 | 5/2012 | Foerster et al. |
| 2013/0042947 A1 | 2/2013 | Berlier et al. |
| 2017/0356077 A1 | 12/2017 | Giraud et al. |
| 2018/0016651 A1 | 1/2018 | Katsumata |
| 2018/0363123 A1 | 12/2018 | Lapierre et al. |

FOREIGN PATENT DOCUMENTS

| | | |
|---|---|---|
| CN | 108823522 A | 11/2018 |
| CN | 112877639 A | 6/2021 |
| EP | 2739761 B1 | 5/2017 |
| WO | 2019223078 A1 | 11/2019 |

OTHER PUBLICATIONS

El-Hossary, F. M., et al. "Duplex treatment of 304 AISI stainless steel using rf plasma nitriding and carbonitriding." Materials Science and Engineering: C 29.4 (2009): 1167-1173.*

Study of MSONiL steel under carburizing and nitriding duplex treatment, Guo-meng Li', Yi-long Liang', Cun-hong Yin, Hao Sun, Zhen-long Zhu, Surface & Coatings Technology, Elsevier.

* cited by examiner

*Primary Examiner* — Jessee R Roe
(74) *Attorney, Agent, or Firm* — GARCIA-ZAMOR INTELLECTUAL PROPERTY LAW, LLC; Ruy Garcia-Zamor

(57) ABSTRACT

A method for reinforcing a steel component, having a carbonitriding step providing a first substep of case-hardening, and a second substep of nitriding, the first and second substeps of case-hardening and of nitriding of the step of carbonitriding the component are performed in one and the same heat treatment cycle.

8 Claims, 5 Drawing Sheets

[Fig 1]
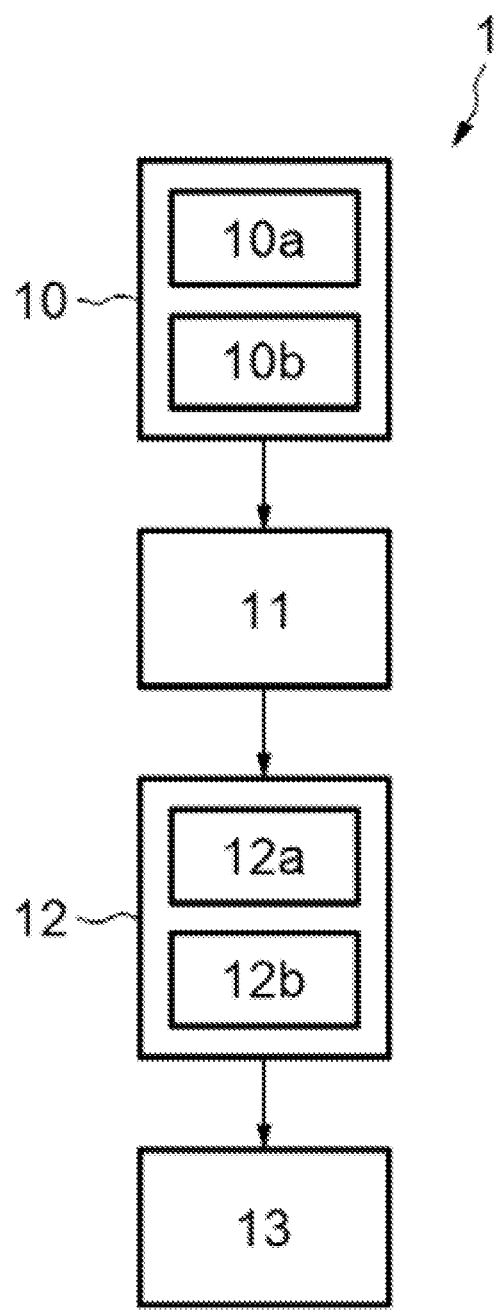

[Fig 2]
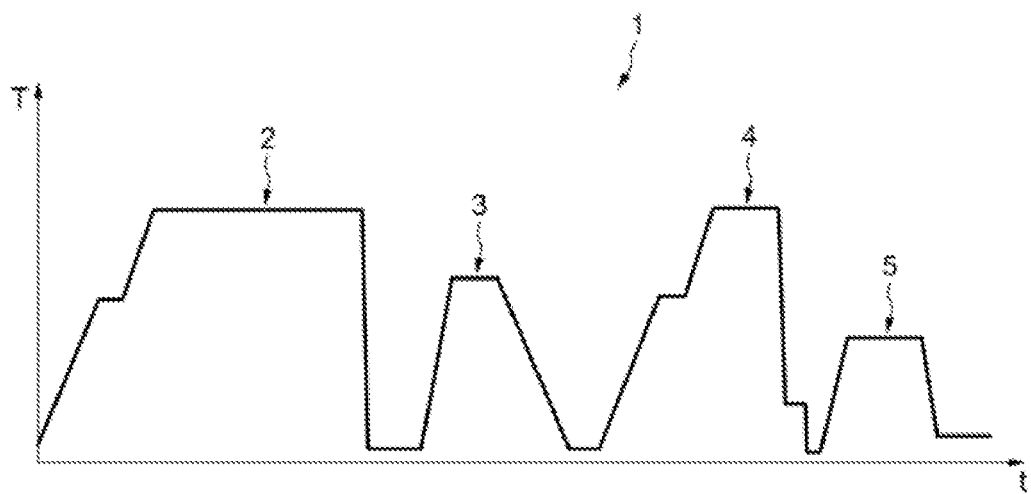

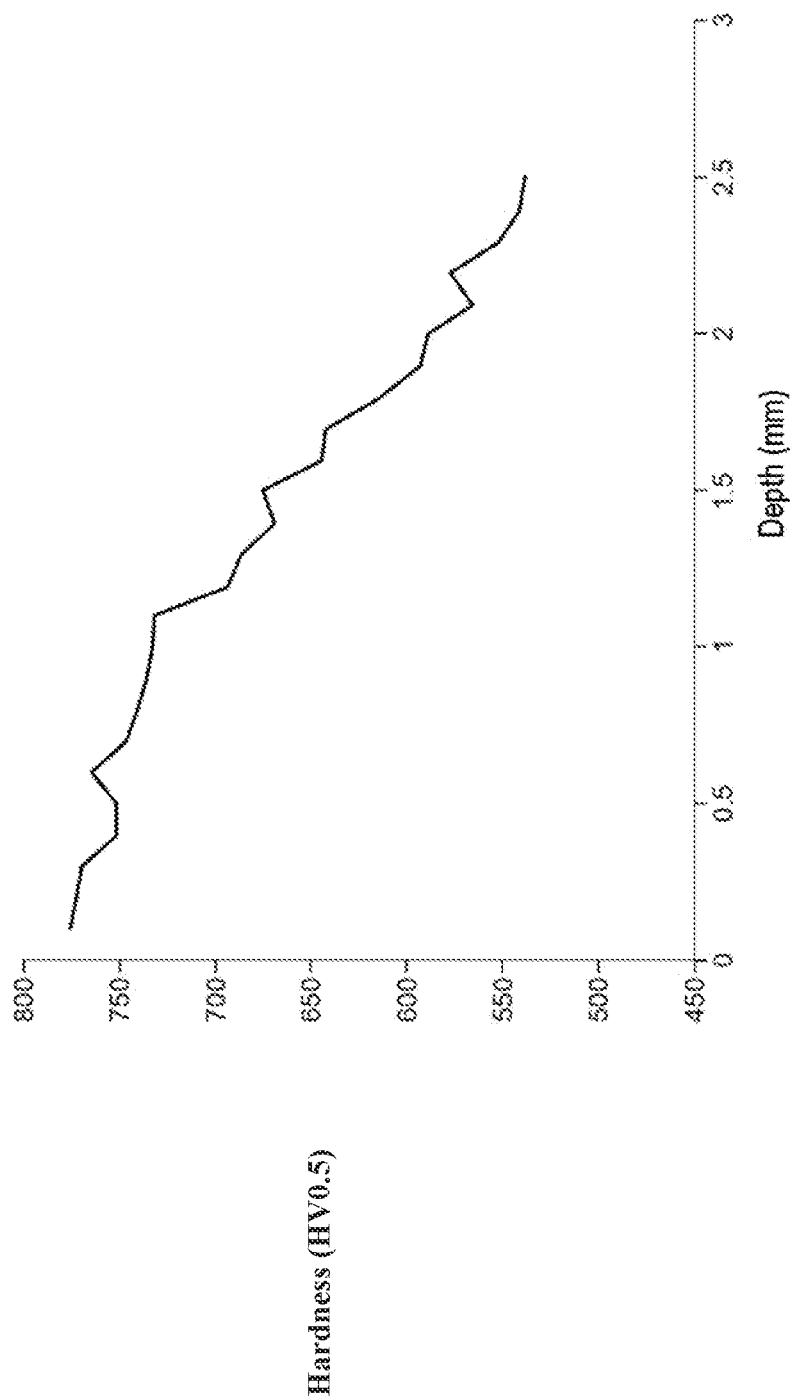

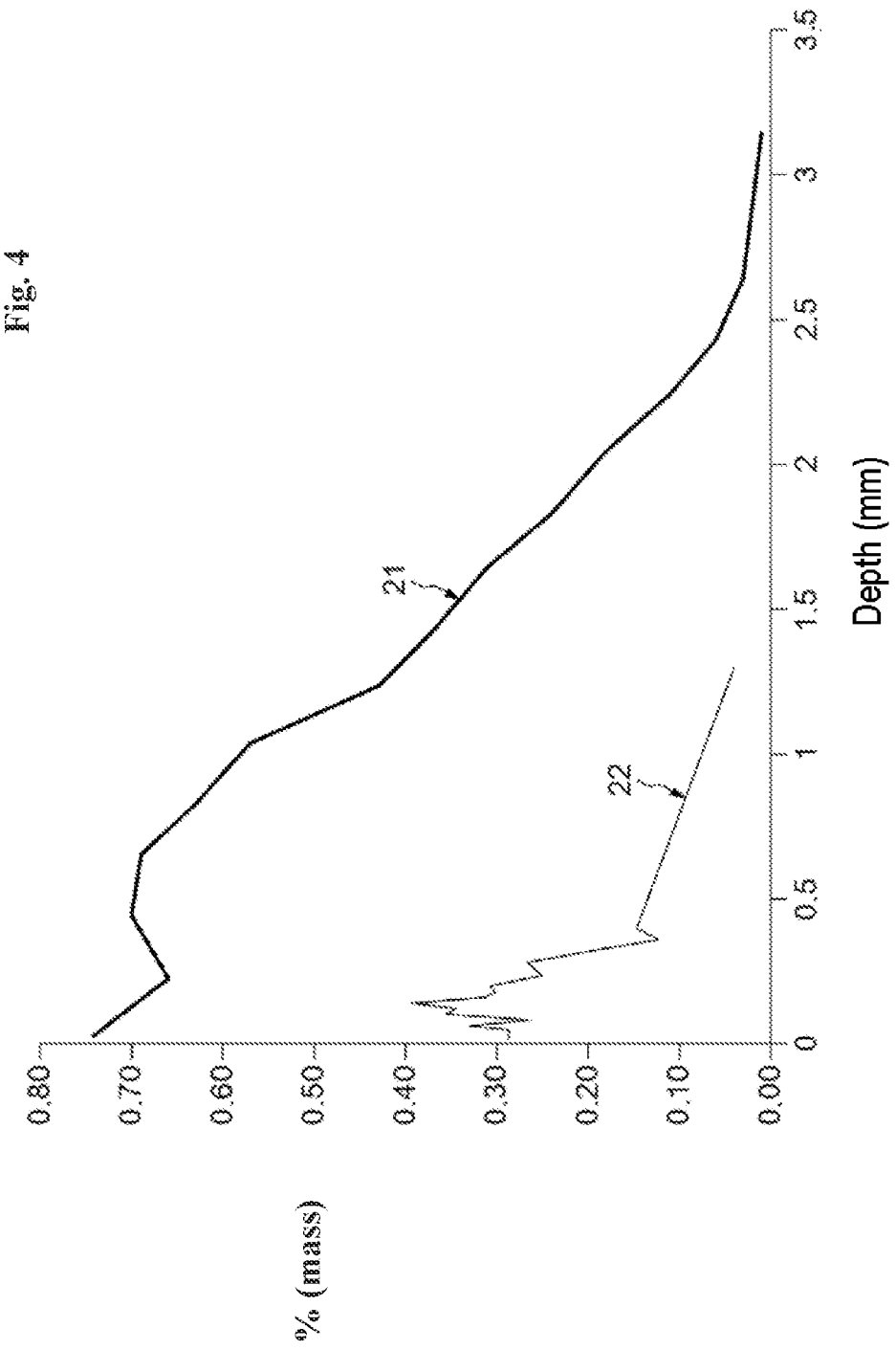

[Fig 5]
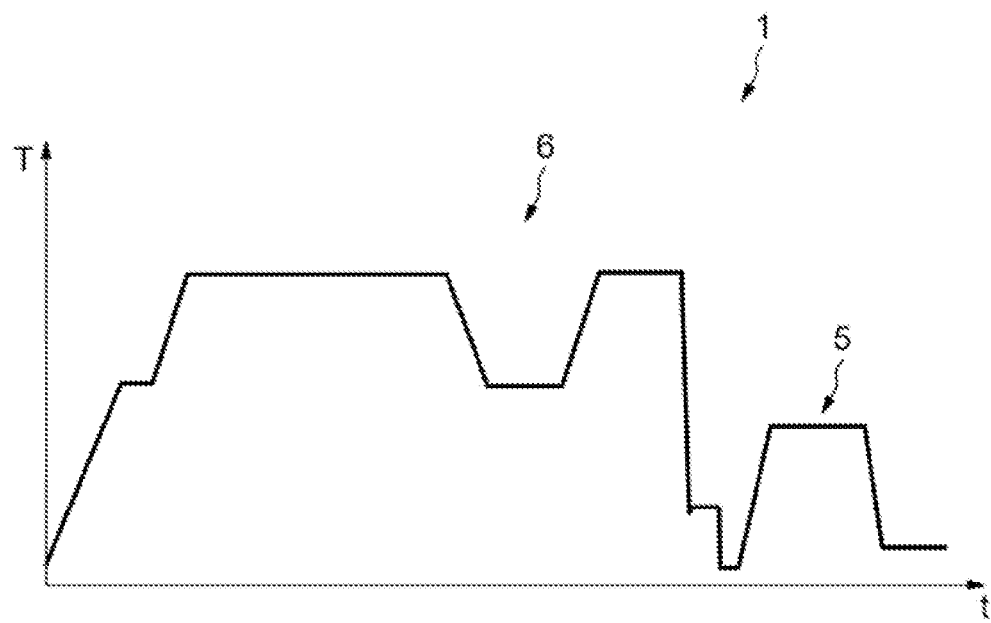

METHOD FOR REINFORCING A STEEL COMPONENT BY CARBONITRIDING

CROSS-REFERENCE TO RELATED APPLICATIONS

This application claims priority to French Patent Application no. 2201204, filed Feb. 11, 2022, the contents of which is fully incorporated herein by reference.

TECHNICAL FIELD OF THE INVENTION

The present invention relates to a method for reinforcing a component made of steel, notably a highly alloyed steel, and to a component reinforced by implementing the method. In particular, the reinforced component may be a constituent part of a rolling-contact bearing, notably one of the rings of the bearing, and possibly the rolling bodies. Advantageously, the invention finds an application in the reinforcing of the rings of an aircraft engine rolling-contact bearing.

PRIOR ART

Aircraft engine rolling-contact bearings may be subjected to heavy loadings which may cause fatigue damage.

The bearings need to be equipped with rings with rolling-contact bearing raceways having a high level of hardness so that they can withstand localized plastic deformation, and having good resistance to rolling-contact fatigue.

Moreover, other functional surfaces of the rings of the bearing, for example a flange or else a squirrel cage, also need to have good fatigue strength, good mechanical strength and good toughness in order to withstand the loads to which they are subjected.

In general, these rings are made of case-hardened M50NiL steel. M50NiL steel is a low-carbon steel alloy with added molybdenum, chromium and nickel. Case-hardening it consists in achieving a higher carbon content at the surface of the steel, thus allowing the components that have undergone this treatment to have a very high hardness with excellent rolling-contact fatigue performance.

Conventionally, on a rolling-contact bearing ring, the depth of the case-hardening, which is to say the thickness of the carbon-enriched layer, is adapted according to the characteristics of the rolling-contact surface, and according to the maximum value of the contact stress.

Recourse to case-hardening may, however, run up against a number of limitations particularly when very high performance is required, for example when very high Hertzian contact stress values are needed in pure contact fatigue or under certain temperature or contamination conditions.

In order to overcome these limitations, recourse is had to a nitriding step, which takes place after successive and earlier case-hardening and quenching steps.

This case-hardening—quenching—nitriding process, known by the name of "duplex hardening", greatly improves the fatigue strength and wearing resistance properties of the surfaces treated.

However, implementing this process is complicated because of the number and duration of the steps required in the production cycle, particularly because of the surface grinding operations that are performed in order to eliminate the deformations caused by the quenching and by the dimensional changes following nitriding.

SUMMARY OF THE INVENTION

In the light of the foregoing, the invention seeks to optimize the production cycle for producing treated surfaces. The invention also seeks to improve the mechanical and tribological properties of the components obtained by comparison with a case-hardening treatment alone, with equivalent production costs.

The subject of the invention is a method for reinforcing a steel component, comprising a carbonitriding step comprising a first substep of case-hardening, and a second substep of nitriding.

In this method, the first and second substeps of case-hardening and of nitriding of the step of carbonitriding the component are performed in one and the same heat treatment cycle.

What is meant by a "heat treatment cycle" is an increase in temperature of the component that is to be reinforced from a low-temperature to a high temperature, a holding of the component at the high temperature, and a lowering of the temperature of the component to the low initial temperature or to below this low initial temperature.

By comparison with a conventional method of the "duplex hardening" type, integrating the substeps of case-hardening and of nitriding into the same heat treatment cycle offers the advantage of simplifying the manufacturing method and of reducing the production costs.

By comparison with a case-hardening method that does not involve nitriding, the components treated by the method of the invention develop better fatigue strength and wearing resistance, for equivalent manufacturing costs.

As a preference, the carbonitriding step is performed at a pressure less than or equal to 150 mbar.

Advantageously, the steel of the component is an M50NiL steel.

M50NiL steel is defined in international standards such as AMS6278 and is characterized by the following chemical composition, given as mass percentage: Carbon 0.11-0.15; Manganese 0.15-0.35; Silicon 0.10-0.25; Phosphorus 0.015 max; Sulfur 0.010 max; Chromium 4.00-4.25; Nickel 3.20-3.60; Molybdenum 4.00-4.50; Vanadium 1.13-1.33; Cobalt 0.25 max; Tungsten 0.15 max; Copper 0.10 max.

According to one advantageous feature, nitrogen and carbon used in the carbonitriding step are brought to the surface of the steel of the component in the form of ammonia and acetylene respectively.

As a preference, the method further comprises a hardening step performed after the carbonitriding step and in the same heat treatment cycle thereas.

For example, the method further comprises a hardening step and an annealing step (technically "an annealing"), each of the steps of carbonitriding, of hardening and of annealing being performed in a heat treatment cycle specific to it, the annealing step being performed after the carbonitriding step and before the hardening step.

Advantageously, the hardening step comprises a first substep of austenitizing the component followed by a second substep of quenching the component.

According to another advantageous feature, the method further comprises a post-treatment step performed after the hardening step and in a heat treatment cycle different from those of the other steps of the method.

Advantageously, the post-treatment step involves the tempering of the component.

For example, the steel component is a rolling-contact bearing ring.

According to a second aspect, the invention has as subject matter of a rolling-contact bearing ring reinforced by implementing the reinforcing method described above.

BRIEF DESCRIPTION OF THE FIGURES

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. In order to more clearly explain the technical solutions of the embodiments of the present disclosure, the drawings needed in the description of the embodiments will be briefly introduced below. Further aims, features and advantages of the invention will become apparent from reading the following description, which is given purely by way of nonlimiting example and with reference to the appended drawings, in which:

FIG. 1 is a flowchart of the reinforcing method according to one embodiment of the invention;

FIG. 2 illustrates the changes in temperature during the reinforcing method according to the invention;

FIG. 3 illustrates the changes in hardness as a function of the distance from the surface for components treated by the method according to the invention;

FIG. 4 illustrates the mass percentages of nitrogen and of carbon content as a function of the distance from the surface for components treated according to the method of the invention; and FIG. 5 illustrates a variant of the reinforcing method according to the invention.

DETAILED DESCRIPTION OF THE INVENTION

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. In order to make the objectives, technical solutions and advantages of the present disclosure more apparent, the exemplary embodiments according to the present disclosure will be described in a clear and complete way below with reference to the drawings. The reinforcing method 1 according to one embodiment of the invention will be described with reference to FIGS. 1 and 2.

The reinforcing method 1 comprises a carbonitriding step 10 comprising a first substep 10b of nitriding and a second substep 10a of case-hardening which is performed simultaneously or successively in relation to the first substep and in one and the same heat treatment cycle 2. The carbonitriding step 10 is preferably performed at a low pressure.

A heat treatment cycle is characterized by an increase in temperature from a low initial temperature to a high temperature, a holding at the high temperature, and a lowering of the temperature to a temperature close to the low initial temperature.

The way the temperature changes during the reinforcing method 1 is depicted in the temperature-time diagram of FIG. 2 and illustrates the succession of heat treatment cycles to which the components treated by the method of the invention are subjected.

FIG. 2 depicts four heat treatment cycles, numbered from 2 to 5. The treatment cycles 2 to 5 are different and successive heat treatment cycles.

The heat treatment cycle 2, which corresponds to the carbonitriding step 10, begins with the case-hardening substep 10a which uses acetylene to supply additional carbon and continues with the nitriding substep 10b which uses ammonia to supply additional nitrogen. The high temperature of the heat treatment cycle 2 may for example be comprised between 800° C. and 1000° C. and is sustained for the time necessary to achieve the desired carbon and nitrogen enrichment of the superficial layers of the treated components. Step 10 ends with a rapid lowering of the temperature of the treated components. The treated components are, for example, brought back down to ambient temperature. The carbonitriding treatment may last from 10 to 50 hours depending on the chosen thickness of case-hardening (from 1 to several millimetres). As indicated previously, the carbonitriding step is preferably performed at a low pressure of less than or equal to 150 mbar.

During the next step 11, the components are annealed in order to improve their ductility. The annealing step 11 corresponds to the heat treatment cycle 3. During this cycle, the treated components are heated and held for a given length of time at a determined temperature, then cooled slowly, for example down to ambient temperature. The high temperature of the heat treatment cycle 3 is lower than the high temperature of the heat treatment cycle 2. For example, the annealing phase takes place in a temperature range comprised between 650-700° C., and for an approximate duration of 4 to 5 hours.

During the next step 12, the components are hardened by a substantial heating making it possible to achieve austenitization of the components (substep 12a) followed by rapid cooling to quench the components (substep 12b). The step 12 of hardening the components corresponds to the heat treatment cycle 4. The high temperature of the heat treatment cycle 4 is substantially equal to that of the earlier heat treatment cycle 2. The austenitization may be performed at a temperature of 1080-1120° C. and for a short duration ensuring thermal homogeneity of the component while avoiding coarsening of the grain size. This complete quenching operation can in general not exceed 2 hours in duration.

During the last step 13, tempering post-treatments are performed in order to increase the resilience of the components. The post-treatment step 13 corresponds to the heat treatment cycle 5. The high temperature of the heat treatment cycle 5 is lower than that of the earlier heat treatment cycle 2. A succession of cooling and tempering steps (tempering in the range 530-560° C.) is applied for a total method time of, for example, between 8 and 12 hours.

The method was optimized for enriching the superficial layer of the treated components to depths in excess of 1 mm.

Following treatment according to the method of the invention, the components have a superficial layer containing martensite enriched with carbon and with nitrogen, finer carbides and carbonitrides. Tests conducted by the applicant have revealed that the thickness of this layer could attain values of between 0.35 mm to 0.40 mm, namely values sufficient for applications in the field of rolling-contact bearing raceways.

The hardness curve illustrated in FIG. 3 shows the changes in hardness as a function of the distance from the surface for components treated according to the method of the invention. The values obtained are comparable with those obtained by case-hardening alone.

FIG. 4 illustrates the mass percentages of nitrogen (curve 22) and of carbon (curve 21) content as a function of the distance from the surface for components treated according to the method of the invention.

The tests conducted by the applicant have made it possible to achieve nitrogen enrichment extending down to depths of as much as 400 µm with a minimal mass percentage of nitrogen of 0.35%, which is significant and sufficient to make it possible to obtain microstructures with superior performance to those obtained by case-hardening alone. At the same time, surface carbon content is found to be high just beyond 200 µm with a value of 0.66%. Indeed, the optimal combination of carbon and of nitrogen makes it possible to achieve the best surface properties and notably to improve the hardness of the carbonitrided surface layer (minimum 770-780 HV shown in FIG. 3). Beyond 100 µm, the residual stresses are compression stresses. Following optimized treatment and grinding operations, it is expected that the surfaces treated according to the method of the invention will exhibit only compressive residual stresses which are beneficial to good fatigue strength.

FIG. 5 shows a variant of the reinforcing method 1 according to the invention, whereby the carbonitriding step 10 and the hardening step 12 are performed in the same heat treatment cycle 6 and without recourse to the annealing step 11. This variant of the method further reduces the duration of the production cycle.

The invention claimed is:

1. A method for reinforcing a steel component, comprising a carbonitriding step comprising a first substep of case-hardening, and a second substep of nitriding, with the first and second substeps of case-hardening and of nitriding of the step of carbonitriding the component are performed in one and the same heat treatment cycle,
wherein nitrogen and carbon used in the carbonitriding step are brought to the surface of the steel of the component in the form of ammonia and acetylene respectively.

2. The method according to claim 1, wherein the carbonitriding step is performed at a pressure less than or equal to 150 mbar.

3. A method for reinforcing a steel component, comprising a carbonitriding step comprising a first substep of case-hardening, and a second substep of nitriding, with the first and second substeps of case-hardening and of nitriding of the step of carbonitriding the component are performed in one and the same heat treatment cycle,
wherein the steel of the component is an M50NiL steel.

4. A method for reinforcing a steel component, comprising a carbonitriding step comprising a first substep of case-hardening, and a second sub step of nitriding, with the first and second sub steps of case-hardening and of nitriding of the step of carbonitriding the component are performed in one and the same heat treatment cycle,
wherein the method further comprises a hardening step performed after the carbonitriding step and in the same heat treatment cycle.

5. The method according to claim 4, wherein the hardening step comprises a first sub step of austenitizing the component followed by a second sub step of quenching the component, the method further comprising a post-treatment step performed after the hardening step and in a heat treatment cycle different from those of the other steps of the method.

6. A method for reinforcing a steel component, comprising a carbonitriding step comprising a first substep of case-hardening, and a second sub step of nitriding, with the first and second sub steps of case-hardening and of nitriding of the step of carbonitriding the component are performed in one and the same heat treatment cycle,
wherein the method further comprises a hardening step and an annealing step, each of the steps of carbonitriding, of hardening and of annealing being performed in a heat treatment cycle specific to it, the annealing step being performed after the carbonitriding step and configured before the hardening step.

7. A method for reinforcing a steel component, comprising a carbonitriding step comprising a first substep of case-hardening, and a second substep of nitriding, with the first and second substeps of case-hardening and of nitriding of the step of carbonitriding the component are performed in one and the same heat treatment cycle,
wherein the steel component is a rolling-contact bearing ring.

8. The method according to claim 5, wherein the post-treatment step includes a tempering of the component.

* * * * *